(12) United States Patent
Liu et al.

(10) Patent No.: US 11,125,929 B2
(45) Date of Patent: Sep. 21, 2021

(54) DISPLAY SYSTEM

(71) Applicant: 3M INNOVATIVE PROPERTIES COMPANY, St. Paul, MN (US)

(72) Inventors: Tao Liu, Woodbury, MN (US); Brian W. Ostlie, Hudson, WI (US); Brent A. Hedding, Hudson, WI (US); Charlie C. Ho, Woodbury, MN (US); Yongshang Lu, Woodbury, MN (US); Jay M. Jennen, Forest Lake, MN (US); David C. Mercord, Prescott, WI (US); Johnnie L. Williams, West Bloomfield, MI (US)

(73) Assignee: 3M Innovative Properties Company, St. Paul, MN (US)

( * ) Notice: Subject to any disclaimer, the term of this patent is extended or adjusted under 35 U.S.C. 154(b) by 22 days.

(21) Appl. No.: 16/463,078

(22) PCT Filed: Jan. 8, 2018

(86) PCT No.: PCT/IB2018/050105
§ 371 (c)(1),
(2) Date: May 22, 2019

(87) PCT Pub. No.: WO2018/138588
PCT Pub. Date: Aug. 2, 2018

(65) Prior Publication Data
US 2019/0377125 A1    Dec. 12, 2019

Related U.S. Application Data

(60) Provisional application No. 62/450,719, filed on Jan. 26, 2017.

(51) Int. Cl.
*F21V 8/00* (2006.01)

(52) U.S. Cl.
CPC .......... *G02B 6/0045* (2013.01); *G02B 6/006* (2013.01); *G02B 6/0055* (2013.01)

(58) Field of Classification Search
CPC .. G02B 6/0036; G02B 6/0045; G02B 6/0055; G02B 6/006
See application file for complete search history.

(56) References Cited

U.S. PATENT DOCUMENTS

2012/0026431 A1* 2/2012 Coggio ................ G02B 6/0056
                                                              349/65
2012/0038990 A1    2/2012 Hao
(Continued)

FOREIGN PATENT DOCUMENTS

EP      0425757     5/1991
EP      0511717     4/1992
(Continued)

OTHER PUBLICATIONS

International Search Report for PCT International Application No. PCT/IB2018/050105, dated Apr. 10, 2018, 5 pages.

*Primary Examiner* — Joseph L Williams
(74) *Attorney, Agent, or Firm* — Robert S. Moshrefzadeh

(57) ABSTRACT

A display system including a lightguide and first and second reflective layers disposed on opposite sides of the lightguide is provided. The lightguide has opposing first and second major surfaces and includes a light extraction pattern for extracting light that would otherwise be confined and propagate within the lightguide primarily by total internal reflection. Light extracted by the light extraction pattern exits the lightguide through at least one of the first and second major surfaces of the lightguide. Each of the first and second reflective layers has an average specular reflectance of at least 50% in a predetermined wavelength range. The light extraction pattern may be repeatedly imaged by the first and (Continued)

second reflective layers to produce three-dimensional stacked images of the light extraction pattern.

17 Claims, 10 Drawing Sheets

(56) References Cited

U.S. PATENT DOCUMENTS

| | | |
|---|---|---|
| 2014/0009912 A1 | 1/2014 | Wheatley |
| 2014/0043846 A1 | 2/2014 | Yang |
| 2014/0240981 A1 | 8/2014 | Weber |
| 2016/0139321 A1 | 5/2016 | Tsai |
| 2016/0370534 A1 | 12/2016 | Liu |

FOREIGN PATENT DOCUMENTS

| | | |
|---|---|---|
| EP | 2522212 | 11/2012 |
| JP | 2011050316 | 3/2011 |
| NL | 1034948 | 7/2009 |
| WO | WO 2008/144656 | 11/2008 |

* cited by examiner

DISPLAY SYSTEM

BACKGROUND

Lightguides may be used to provide illumination in various applications such as strip and panel lighting. A lightguide may include a plurality of notches such that light striking the notches is reflected out of the lightguide.

SUMMARY

In some aspects of the present description, a display system including a lightguide and first and second reflective layers disposed on opposite sides of the lightguide is provided. The lightguide has opposing first and second major surfaces and a first side surface at a first end of the lightguide extending between and joining the first and second major surfaces, and includes a light extraction pattern for extracting light that would otherwise be confined and propagate within the lightguide primarily by total internal reflection. Light extracted by the light extraction pattern exits the lightguide through at least one of the first and second major surfaces of the lightguide. The first and second reflective layers are disposed on opposite sides of the lightguide adjacent the respective first and second major surfaces of the lightguide. An average specular reflectance of each of the first and second reflective layers is at least 50% in a predetermined wavelength range.

In some aspects of the present description, a display system including a lightguide sandwiched between and substantially coextensive with substantially specularly reflective first and second reflective layers is provided. When the display system is activated, a plurality of a same image is displayed stacked along a thickness direction of the lightguide. A brightness of the stacked images decreases along the thickness direction.

In some aspects of the present description, a display system including substantially parallel, coextensive first and second reflective layers having a substantially uniform spacing of less than about 5 mm therebetween is provided. Each reflective layer has an average specular reflectance of at least 85% in a predetermined wavelength range, and at least one of the reflective layers has an average specular transmittance of about 1% to about 15% in the predetermined wavelength range.

In some aspects of the present description, a display system including substantially parallel, coextensive first and second reflective polarizers having a substantially uniform spacing of less than about 5 mm therebetween is provided. The first reflective polarizer has an average specular reflectance of at least 85% in a predetermined wavelength range for light polarized along a first block axis, and the second reflective polarizer has an average specular reflectance of at least 85% in the predetermined wavelength range for light polarized along a second block axis. At least one of the first and second reflective polarizers has an average specular transmittance of about 1% to about 15% in the predetermined wavelength range for light polarized along the corresponding block axis.

DETAILED DESCRIPTION

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some embodiments of the present description, a display system includes a lightguide between reflective layers where at least one of the reflective layers allows some transmission so that images of an extraction pattern disposed in or on the light guide is viewable at a predetermined viewing distance from the display system. In some embodiments, light extracted by the extraction pattern undergoes multiple reflections between the two reflective layers with some fraction of the light incident on at least one of the reflective layers transmitted through the reflective layer to a viewer. In some embodiments, the multiple reflections produces three-dimensional stacked images of the light extraction pattern. The display systems can be used to display information or decorative images, for example, depending on the chosen extraction pattern.

Figure 1:
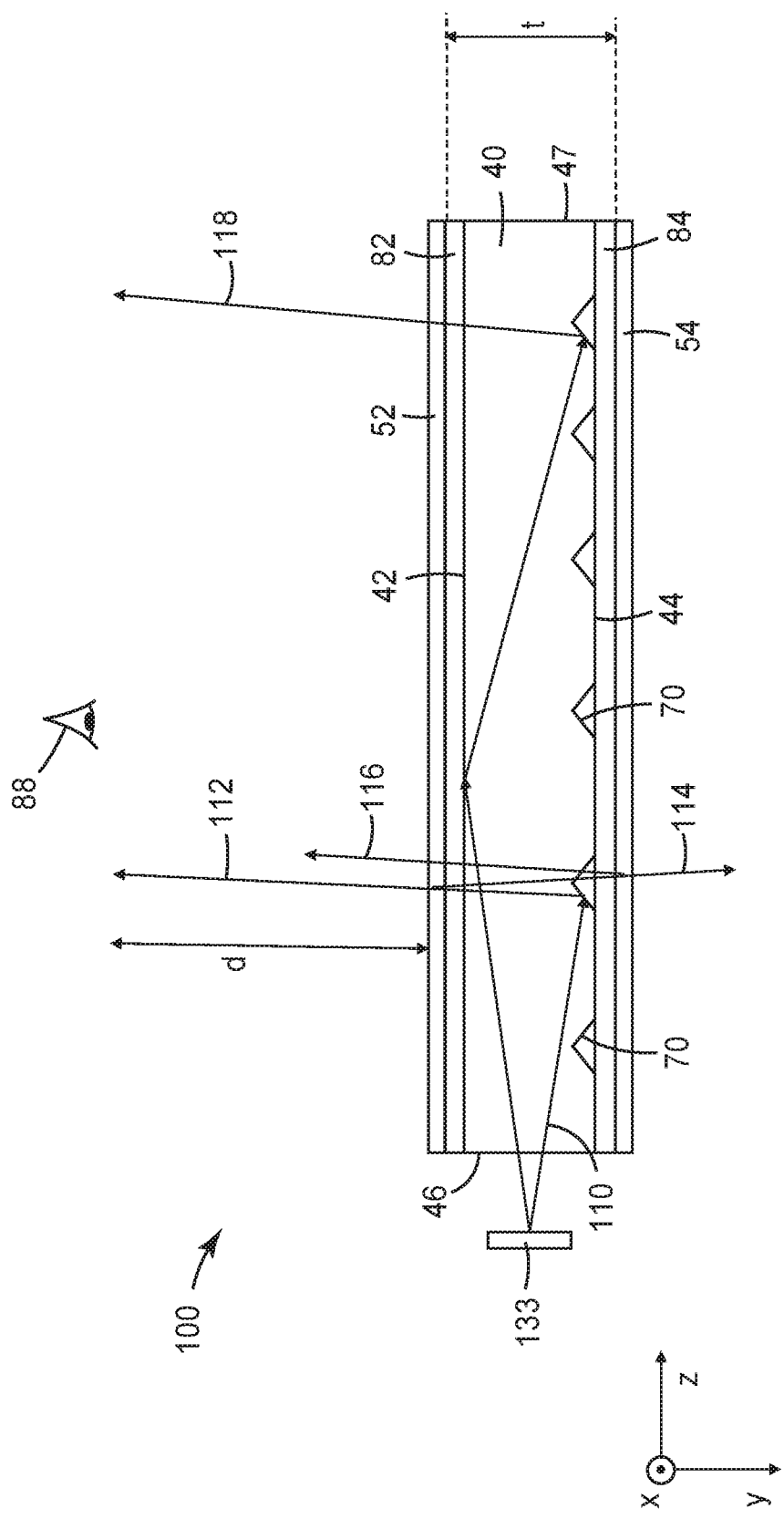
FIG. 1 is a schematic cross-sectional view of a display system.

FIG. 1 is a schematic cross-sectional view of display system 100 including a lightguide 40 and first and second reflective layers 52 and 54 disposed on opposite sides of the lightguide 40 adjacent respective first and second major surfaces 42 and 44 of the lightguide 40. The lightguide 40 includes the opposing first and second major surfaces 42 and 44, a first side surface 46 at a first end of the lightguide extending between and joining the first and second major surfaces 42 and 44, and a second side surface 47 at a second end of the lightguide extending between and joining the first and second major surfaces 42 and 44. An x-y-z coordinate system is illustrated in FIG. 1. The lightguide 40 has a length in the z-direction, a width in the x-direction and a thickness in the y-direction. The lightguide 40 also includes a light extraction pattern 70 for extracting light 110 that would otherwise be confined and propagate within the lightguide 40 primarily by total internal reflection (TIR). The light extracted by the light extraction pattern 70 exits the lightguide 40 through at least one of the first and second major surfaces 42 and 44 of the lightguide 40. Light 112 exits the first major surface 42 and is transmitted through reflective layer 52 towards a viewer 88. Light 114 exits the first major surface 42 is reflected from reflective layer 52 and is then transmitted through the first and second major surfaces 42 and 44 and through reflective layer 54. Light 116 exits the first major surface 42 is reflected from reflective layer 52 and is then transmitted through first and second major surfaces 42 and 44, reflects from reflective layer 54 is transmitted back through lightguide 40 and through reflective layer 52 towards viewer 88. Light 116 reflects once from each of the first and second reflective layers 52 and 54 before exiting the display system. Other light rays may reflect multiple times from each reflective layer before exiting the display system. The output of the display system 100 can be provided to viewers on one or both sides of the lightguide 40. In some embodiments, the second reflective layer 54 is selected to have a higher reflectivity than the first reflective layer 52 so that most of the light output from the display system is directed generally towards the viewer 88.

In some embodiments, an optional first buffer layer 82 is disposed between and attached to the first reflective layer 52 and the lightguide 40. In some embodiments, the first buffer layer 82 has an index of refraction less than an index of refraction of the lightguide 40. The index of refraction refers to the index of refraction at the average wavelength in the predetermined wavelength range unless indicated differently. For example, if the predetermined wavelength range is from 400 nm to 700 nm, the index of refraction is the index of refraction determined at 550 nm. In some embodiments, an optional second buffer layer 84 is disposed between and attached to the second reflective layer 54 and the lightguide 40. In some embodiments, the second buffer layer 84 has an index of refraction less than an index of refraction of the lightguide 40. The first and/or second buffer layers 82 and 84 may be included to prevent direct contact of the first and second reflective layers 52 and 54 with the lightguide 40 from defeating total internal reflection (TIR) of the light within the lightguide.

The first and/or second buffer layers 82 and 84 may be fluoropolymer layers, for example. Suitable fluoropolymers include fluorinated ethylene propylene (FEP) which is a copolymer of hexafluoropropylene and tetrafluoroethylene. Other useful materials for the first and/or second buffer layers 82 and 84 include ultra-low index (ULI) materials having a refractive index less than 1.3 such as the nano-voided materials described in U.S. Pat. Appl. Pub. No. 2012/0038990 (Hao et al.).

Display system 100 includes a light source 133 disposed proximate the first side surface 46 of the lightguide 40. Light emitted by the light source 133 enters the lightguide 40 through the first side surface 46 and propagates within the lightguide 40 primarily by total internal reflection. For example, light 118 reflects (TIRs) from first major surface 42 before being redirected by light extraction pattern 70. Without the light extraction pattern 70, light 118 would be confined within the lightguide 40 by total internal reflection. The light extraction pattern 70 extracts the propagating light 118 and is visible to a viewer from a predetermined viewing distance d. In some embodiments, the light extraction pattern 70 is selected such that a viewer 88 at the predetermined viewing distance d in a preferred range experiences a preferred viewing pattern. In some embodiments, the predetermined viewing distance d is greater than about 1 meter. In some embodiments, the predetermined viewing distance d is less than about 5 meters. Typically, the viewer 88, who can be assumed to have 20/20 vision, can see the viewing pattern at the predetermined viewing distance d without the need of a vision aid in ordinary or dimmed room lighting conditions. In some embodiments, a second light source is disposed proximate the second side surface 47 (see, e.g., FIG. 6).

In some embodiments, an average specular reflectance of each of the first and second reflective layers 52 and 54 is at least 50%, or at least 60%, or at least 70%, or at least 80%, or at least 85%, or at least 90% in a predetermined wavelength range. In some embodiments, these average specular reflectance values hold when averaged over polarization states, and in some embodiments these average specular reflectance values hold for at least one polarization state (e.g., for light polarized along a block axis or for light in each of two orthogonal polarization states). When no reference is made to a polarization state, the average specular or diffuse reflectance in a predetermined wavelength range refers to the unweighted average over the wavelength range and over polarization state of the normal incidence specular or diffuse reflectance, respectively. When a reference is made to a polarization state, the average specular or diffuse reflectance in a predetermined wavelength range refers to the unweighted average over the wavelength range for the given polarization state of the normal incidence specular or diffuse reflectance, respectively. In some embodiments, the average specular reflectance (averaged over wavelength and polarization state) of one, but not the other, of the first and second reflective layers 52 and 54 is at least 80%, or at least 85%, or at least 90% in the predetermined wavelength range. In some embodiments, the average specular reflectance of one, but not the other, of the first and second reflective layers 52 and 54 is at least 80%, or at least 85%, or at least 90% in the predetermined wavelength range for at least one polarization state (e.g., for light polarized along a block axis or for light in each of two orthogonal polarization states). In some embodiments, at least one of the first and second reflective layers 52 and 54 have an average specular transmittance (averaged over wavelength and polarization state) of about 1% to about 5%, or to about 10%, or to about 15% in the predetermined wavelength range. In some embodiments, at least one of the first and second reflective layers 52 and 54 have an average specular transmittance of about 1% to about 5%, or to about 10%, or to about 15% in the predetermined wavelength range for at least one polarization state (e.g., for light polarized along a block axis or for light in each of two orthogonal polarization states). In some embodiments, the average specular reflectance of each of the first and second reflective layers is at least 50%, or at least 60%, or at least 70%, or at least 80%, or at least 85%, or at least 90%, in the predetermined wavelength range for each of two mutually orthogonal polarization states.

In some embodiments, the specular reflectance is independent or approximately independent of the polarization state of the incident light. A reflector or reflective layer having an average specular reflectance of at least 80% in a predetermined wavelength range for each of two orthogonal polarization states is referred to herein as a minor. In some embodiments, the first and second reflective layers 52 and 54 are first and second minors or first and second portions of a mirror (see, e.g., FIG. 4). In some embodiments, the first reflective layer 52 has an average specular transmittance of about 1% to about 5% in the predetermined wavelength range for one polarization state, or for two orthogonal polarization states, or for an average over polarization states, and the second reflective layer 54 has an average specular reflectance of at least 80%, or at least 85%, or at least 90% in the predetermined wavelength range for one polarization state, or for two orthogonal polarization states, or for an average over polarization states.

A reflective layer having an average specular reflectance of at least 60% in a predetermined wavelength range for a first polarization state and an average specular transmittance of at least 60% in the predetermined wavelength range for a different second polarization state is referred to herein as a reflective polarizer. In some embodiments, one of the first and second reflective layers 52 and 54 is a reflective polarizer. In some embodiments, the other of the first and second reflective layers 52 and 54 is a mirror. In some embodiments, the first and second reflective layers 52 and 54 are first and second reflective polarizers or first and second portions of a reflective polarizer.

Figure 2:
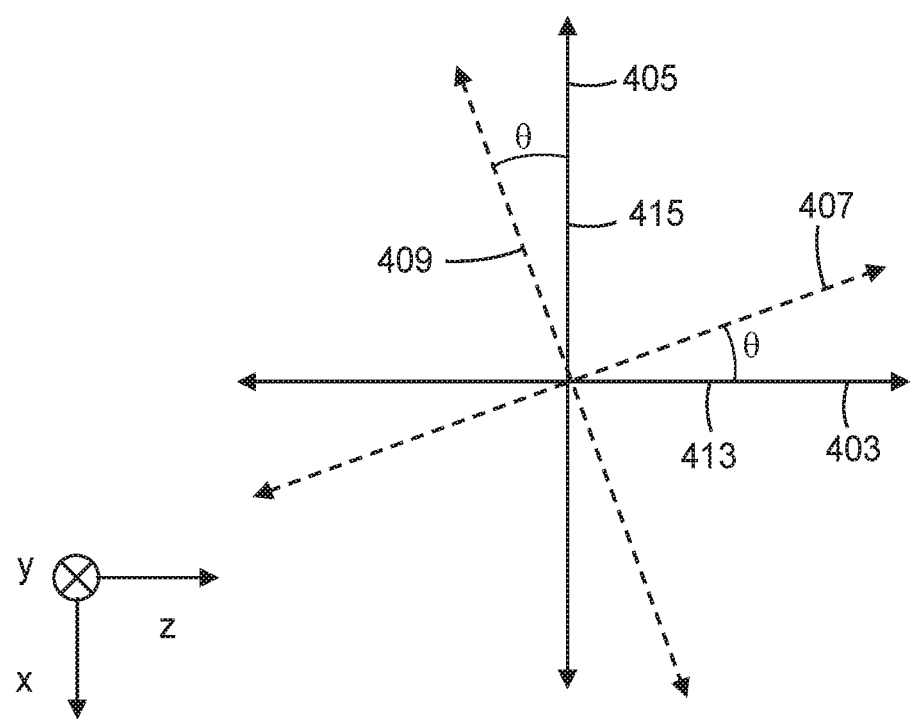
FIG. 2 is a schematic illustration of block and pass axes of first and second reflective polarizers.

FIG. 2 schematically illustrates orthogonal first block axis 403 and first pass axis 405 for a first reflective polarizer and orthogonal second block axis 407 and second pass 409 for a second reflective polarizer. The orthogonal first block axis 403 and first pass axis 405 (and similarly for orthogonal second block axis 407 and second pass axis 409) define two mutually orthogonal polarization states: a polarization state 413 with the electric field polarized along the first block axis 403 and a polarization state 415 with the electric field polarized along the first pass axis 405. An angle θ between the first and second pass axes 405 and 409 is illustrated. The angle between the first and second block axes 403 and 407 is also θ if the pass and block axes of each of the reflective polarizers are orthogonal. In some embodiments, the second pass axis 409 is parallel to the first pass axis 405 (i.e., θ is zero). In some embodiments, the second pass axis 409 is perpendicular to the first pass axis 405 (i.e., θ is 90 degrees). In some embodiments, the second block axis 407 is parallel to the first block axis 403 (i.e., θ is zero). In some embodiments, the second block axis 407 is perpendicular to the first block axis 403 (i.e., θ is 90 degrees). In embodiments where the second block axis 407 is perpendicular to the first block axis 403, multiple reflections between the two reflective polarizers can occur due, in part, to the retardation of the lightguide or other layers (e.g., an optional retarder) disposed between the two reflective polarizers. In some embodiments, the angle θ between the first and second pass axes 405 and 409, or between the first and second block axes 403 and 407, is between 1 and 89 degrees, or between 10 and 80 degrees.

In some embodiments, at least one of the first and second reflective layers 52 and 54 have a diffuse reflectance in addition to a specular reflectance. Diffuse reflectance refers to the reflectance of light in directions different from that of the specularly reflected component. Diffuse reflectance can be achieved by adding a diffusing layer onto an otherwise specular reflector. In some embodiments, an average diffuse reflectance (averaged over wavelength and polarization state) of at least one of the first and second reflective layers is at least 1% in the predetermined wavelength range. In some embodiments, an average diffuse reflectance of at least one of the first and second reflective layers is at least 1% in the predetermined wavelength range in at least one polarization state (e.g., for light polarized along a block axis or for light in each of two orthogonal polarization states).

In some embodiments, an optical haze of at least one of the first and second reflective layers 52 and 54 is between about 0.5% to about 5% in the predetermined wavelength range. Optical haze can be determined using a HAZE-GARD PLUS meter (available from BYK-Gardner Inc., Silver Springs, Md.) as described in ASTM D1003-13.

In some embodiments, the first and second reflective layers 52 and 54 are substantially parallel and coextensive and have a substantially uniform spacing t of less than about 5 mm, or less than 3 mm, therebetween. In some embodiments, each reflective layer has an average specular reflectance of at least 80%, or at least 85%, or at least 90% in a predetermined wavelength range, and at least one of the reflective layers has an average specular transmittance of about 1% to about 5%, or to about 10%, or to about 15%, in the predetermined wavelength range. In some embodiments, the second reflective layer 54 has an average specular reflectance of at least 90% in a predetermined wavelength range, and the first reflective layer 52 has an average specular transmittance of about 1% to about 5% or to about 10% in the predetermined wavelength range. In some embodiments, the first reflective layer 52 is a first mirror and the second reflective layer 54 is a second mirror separate from the first mirror. In other embodiments, the first and second reflective layers are first and second portions of a continuous mirror as described further elsewhere herein.

In some embodiments, the first and second reflective layers 52 and 54 are first and second reflective polarizers that are substantially parallel and coextensive and have a substantially uniform spacing t of less than about 5 mm, or less than 3 mm, therebetween. In some embodiments, the first reflective polarizer has an average specular reflectance of at least 80%, or at least 85%, or at least 90% in a predetermined wavelength range for light polarized along a first block axis, the second reflective polarizer has an average specular reflectance of at least 80%, or at least 85%, or at least 90% in the predetermined wavelength range for light polarized along a second block axis, and at least one of the reflective polarizers has an average specular transmittance of about 1% to about 5%, or to about 10%, or to about 15% in the predetermined wavelength range for light polarized along the corresponding block axis. In some embodiments, the second reflective polarizer has an average specular reflectance of at least 90% in the predetermined wavelength range for light polarized along the second block axis, and the first reflective polarizer has an average specular transmittance of about 1% to about 5% or to about 10% in the predetermined wavelength range for light polarized along the first block axis.

The predetermined wavelength range is a wavelength range over which the display system is configured to provide a desired output. In some embodiments, this wavelength range is in a visible range of the electromagnetic spectrum. In some embodiments, this wavelength range is the visible range of about 400 nm to about 700 nm. In other embodiments, a colored output in a limited wavelength range is desired and the predetermined wavelength range may be some subset of the visible range. For example, if a red output is desired, the predetermined wavelength range may be from about 600 nm to about 700 nm. Similarly, in other embodiments, the predetermined wavelength range may be from about 400 nm to about 500 nm, or from about 500 nm to about 600 nm, or over some other subset of the visible range.

Figure 3:
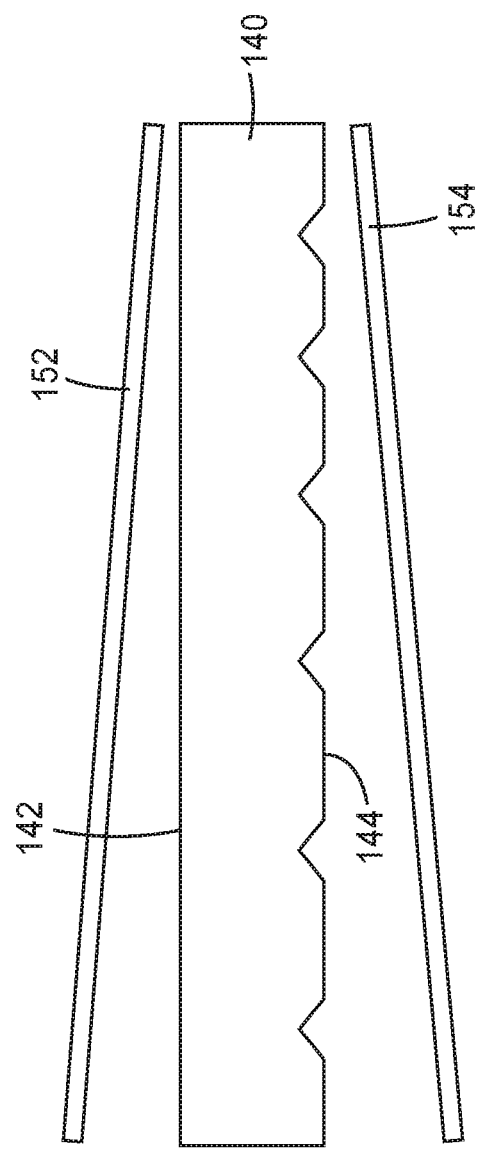
FIGS. 3-4 are schematic cross-sectional views of display systems.

In some embodiments, a spacing between at least one of the first and second reflective layers and the lightguide is non-uniform across the lightguide. This is illustrated in FIG. 3 which is a schematic cross-sectional view of a display system 200 including a lightguide 140 and first and second reflective layers 152 and 154 disposed on opposite sides of the lightguide 140 adjacent first and second major surfaces 142 and 144, respectively. Display system 200 may correspond to display system 100 except for the orientation of the first and second reflective layers 152 and 154. In other embodiments, one, but not the other, of the first and second reflective layers 152 and 154 are parallel to a major surface of the lightguide 140. In still other embodiments, the first and second reflective layers 152 and 154 are parallel to each other but not to a major surface of the lightguide 140.

Figure 4:
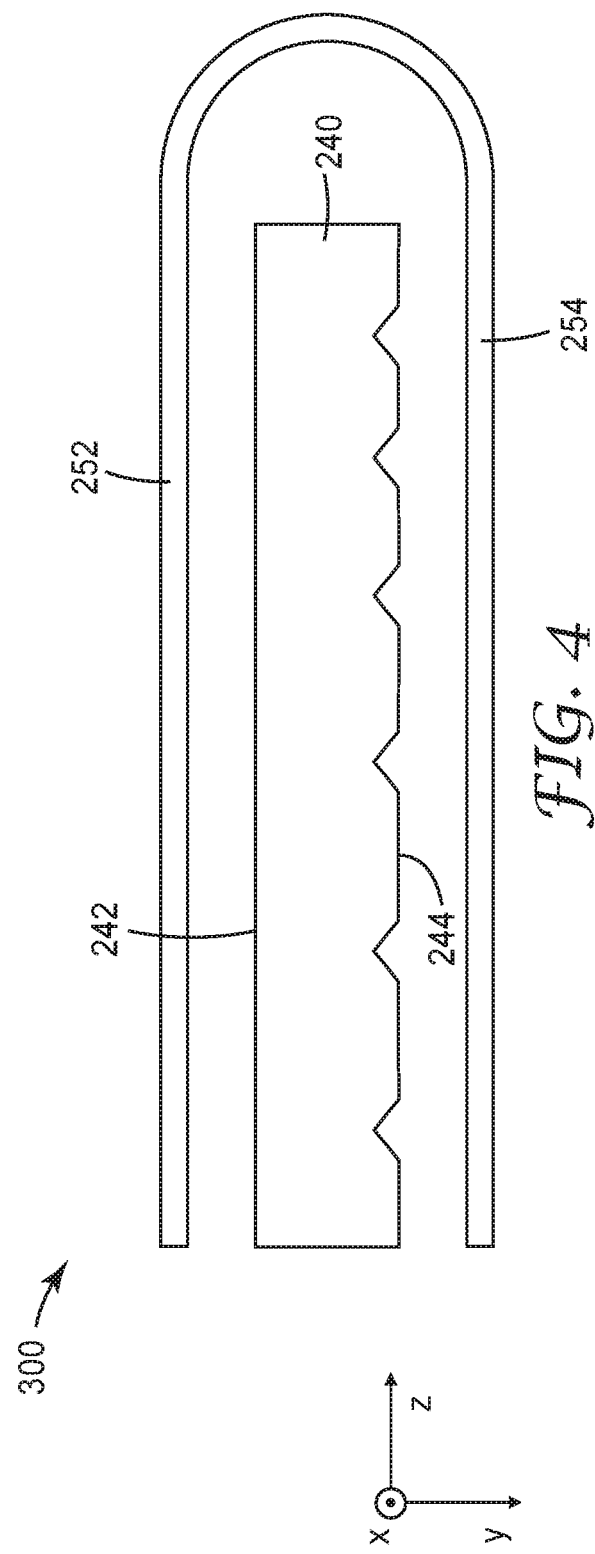

In some embodiments, the first reflective layer is a first reflector and the second reflective layer is a second reflector separate from the first reflector. In other embodiments, the first and second reflective layers are first and second portions of a continuous reflector. This is illustrated in FIG. 4 which is a schematic cross-sectional view of a display system 300 including a lightguide 240 and a continuous reflector 250 having a first portion 252 disposed adjacent first major surface 242 and a second portion 254 disposed on an opposite side of the lightguide 240 adjacent second major surface 244. Display system 300 may correspond to display system 100 except for the continuity of the reflector 250. In some embodiments, the reflector 250 is a mirror. In some embodiments, the reflector 250 is a reflective polarizer. The continuous reflector 250 may be wrapped around the length of lightguide 240 as illustrated or may alternatively be wrapped around the width of the lightguide 240.

Figure 5:
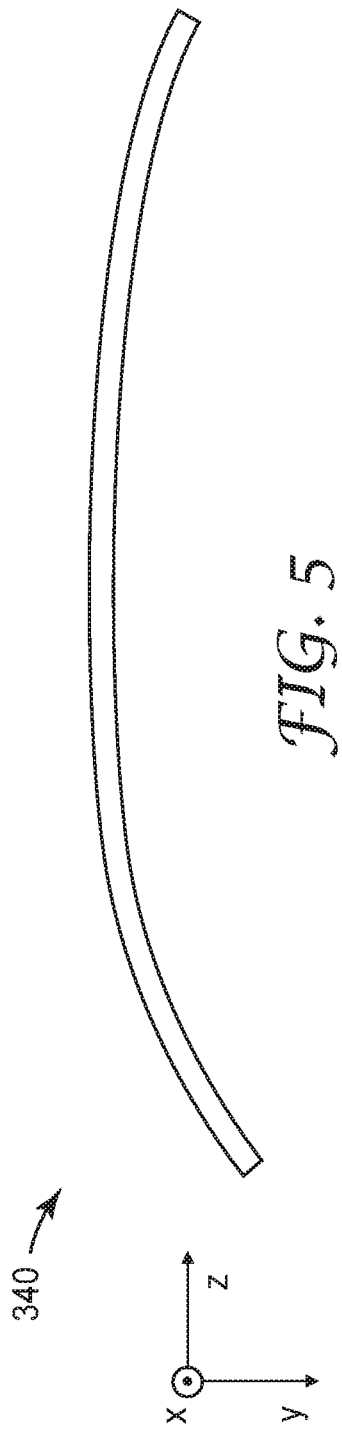
FIG. 5 is a schematic cross-sectional view of a curved lightguide.
Figure 6:
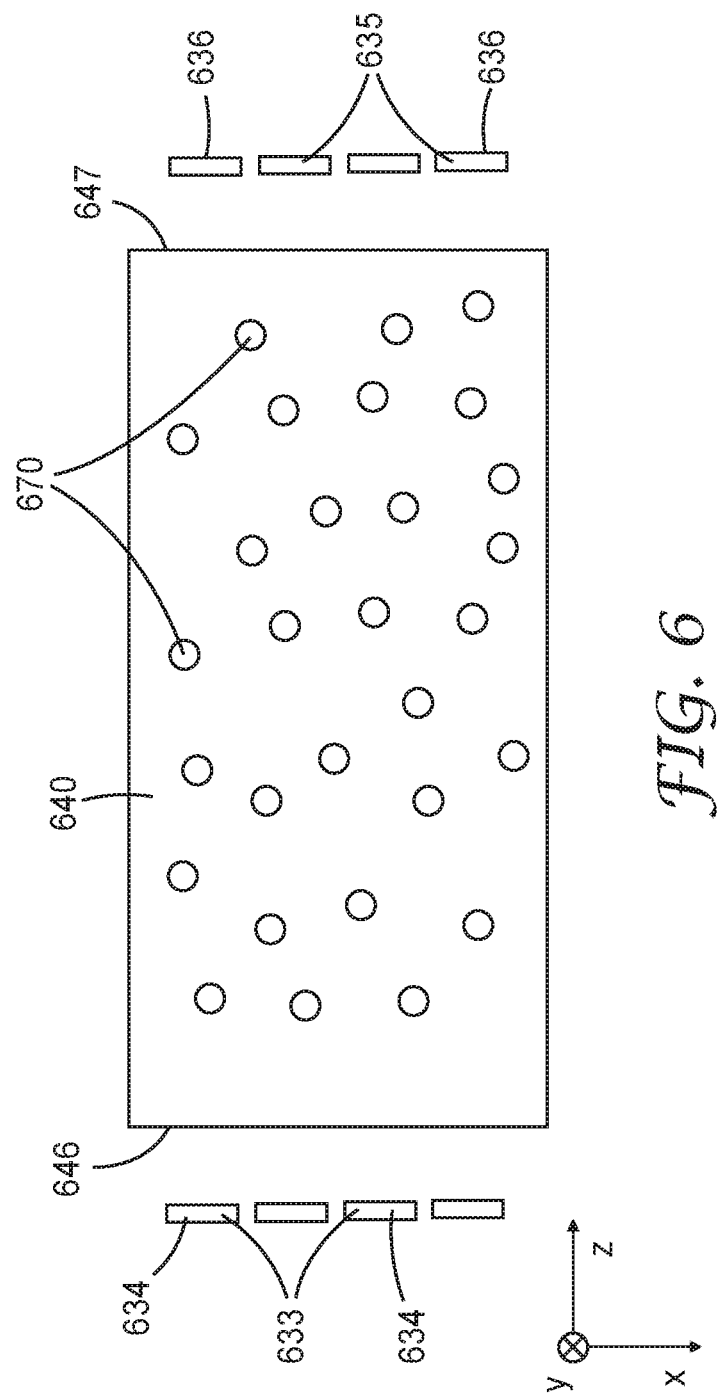
FIG. 6 is a schematic plan view of a lightguide and first and second light sources.

In some embodiments, the lightguide is flexible. A flexible lightguide may be bent into a curved shape. FIG. 5 is a cross-sectional view of lightguide 340 which is curved. In other embodiments, the lightguide is substantially planar as illustrated in FIGS. 1 and 6, for example. A lightguide that is nominally planar but that deviates from being planar due to ordinary manufacturing variations can be described as substantially planar. A lightguide which has other small deviations from planarity which does not significantly affect the optics of the display system may also be considered substantially planar.

Any of the display systems of the present description may include a first light source disposed proximate the first side surface of the lightguide such that light emitted by the first light source enters the lightguide through the first side surface and propagates within the lightguide primarily by total internal reflection. In some embodiments, the light extraction pattern of the lightguide extracts the propagating light toward a viewer at a predetermined viewing distance such that the light extraction pattern is visible to the viewer without a vision aid. In some embodiments, a second light source is disposed proximate a second side surface of the lightguide opposite the first side surface such that that light emitted by the second light source enters the lightguide through the second side surface and propagates within the lightguide primarily by total internal reflection.

FIG. 6 is a schematic plan view of a lightguide 640 with a first light source 633 disposed proximate a first side 646 of the lightguide 640 and a second light source 635, which may optionally be omitted, disposed proximate an opposite second side 647 of the lightguide 640. The lightguide 640 includes a light extraction pattern defined by a plurality of discrete spaced apart light extractors 670. The first light source 633 includes a plurality of light emitters 634 and the second light source 635 includes a plurality of light emitters 636. The light emitters 634 and 636 may be light emitting diodes (LEDs), for example. In some embodiments, the first and/or second light sources 633 and/or 635 has a colored output that can be changed. For example, the first and/or second light sources 633 and/or 635 may include colored LEDs which can be selectively turned on or off to provide a color changing light output.

In some embodiments, light extracted by the light extraction pattern has a substantially non-uniform brightness distribution across the lightguide. For example, the brightness may be high near the light extractors 670 and low in regions between the light extractors 670. A brightness distribution having a bright portion at least 20 percent brighter than a dark portion is described herein as a substantially non-uniform brightness distribution.

In some embodiments, the lightguide is sufficiently thin and the first and second reflective layers are sufficiently close to one another that the light extraction pattern is repeatedly imaged by the first and second reflective layers to produce a substantially hall of mirrors effect. A substantially hall of mirrors effect refers to repeated images of the light extraction pattern where the images are closely spaced and have a varying attribute such as brightness or size. In some embodiments, the light extraction pattern and repeated images thereof are visible to a viewer from a predetermined viewing distance (e.g., between about 1 and about 5 meters) without a vision aid. In some embodiments, a display system 100 includes a lightguide 40 sandwiched between and substantially coextensive with first and second reflective layers 52 and 54, each of which may be substantially specularly reflective, such that when the display system 100 is activated, a plurality of a same image is displayed stacked along a thickness direction of the lightguide 40. Two layers extending over a common area of at least 80 percent of the area of the larger of the two layers is described herein as substantially coextensive. A reflector having a specular component of reflectivity of at least 80 percent of the overall reflectivity is described herein as substantially specularly reflective.

Figure 7:
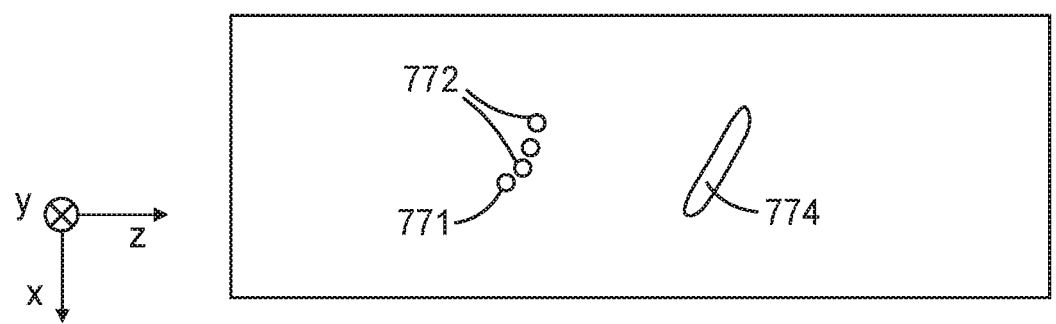
FIG. 7 is a schematic plan view of a display system.

FIG. 7 is a schematic plan view of a display system showing a plurality 772 of a same image 771 of a light extraction feature. The plurality of the same image 771 is displayed stacked along at least a thickness direction (y-direction) of the lightguide. In some embodiments, the brightness of the stacked images decrease along the thickness direction (y-direction). For example, the brightness may appear highest at the top of the stack of images and may appear to decrease in the y-direction away from the top of the stack. In some embodiments the images of a light extractor are sufficiently closely spaced that the plurality of images appears to a viewer as illuminated tube-like structures 774. In some embodiments, this tube-like structure 774 appears to extend three dimensionally from the lightguide. In some embodiments, a pattern of light extractors results in a three-dimensional pattern of tube-like structures. For ease of illustration the images of only two light extraction features are shown in FIG. 7. In many embodiments, the lightguide will include substantially more than two light extraction features (see, e.g., FIG. 6).

Any or all of the light extractors may extract light primarily by scattering the light, by reflecting the light, or by refracting the light. For example, a diffuser can be applied to a portion of an exterior surface of the lightguide to extract light by scattering the light. In this case, the scattering objects (e.g., beads) in the diffuser are a plurality of light extractors that extract the light primarily by scattering the light. The light extractors may be notches or protrusions formed in an exterior surface of the lightguide. In some embodiments, at least one light extractor is a notch formed in an exterior surface of the lightguide, and at least one light extractor is a protrusion formed on the exterior surface of the lightguide. In some embodiments, at least one light extractor is a notch formed in an exterior surface of the lightguide, and at least one light extractor in the pluralities of first, second and third light extractors is a protrusion formed on the exterior surface of the lightguide. In some embodiments, each of the light extractors extracts light primarily by reflecting the light. In some embodiments, each of the light extractors extracts light primarily by refracting the light. In some embodiments, each of the light extractors extracts light primarily by reflecting the light. In some embodiments, one or more light extractors extracts light primarily by one of diffusing, reflecting, or refracting the light, and a different light extractor extractors extracts light primarily by a different one of diffusing, reflecting, or refracting the light. In some embodiments, at least a portion of the light extraction pattern is disposed on at least one of the first and second major surfaces of the lightguide.

Figure 8:
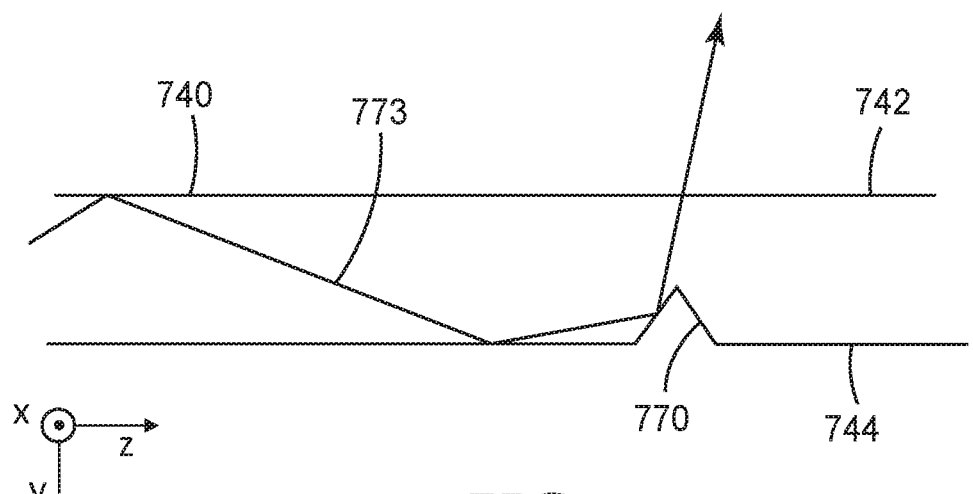
FIGS. 8-11 are schematic cross-sectional views of lightguides.

FIG. 8 is a schematic cross-sectional view of lightguide 740 having opposing first and second major surfaces 742 and 744 and including a light extractor 770 which is a notch formed in second major surface 744 of lightguide 740 which is an exterior surface of the lightguide 740. Light 773 propagates within the lightguide 740 and is confined within the lightguide 740 primarily by total internal reflection. Light 773 is extracted from the lightguide 740 by reflection of the light from light extractor 770. Light extractor 770 may alternatively or in addition be formed in the first major surface 742.

Figure 9:
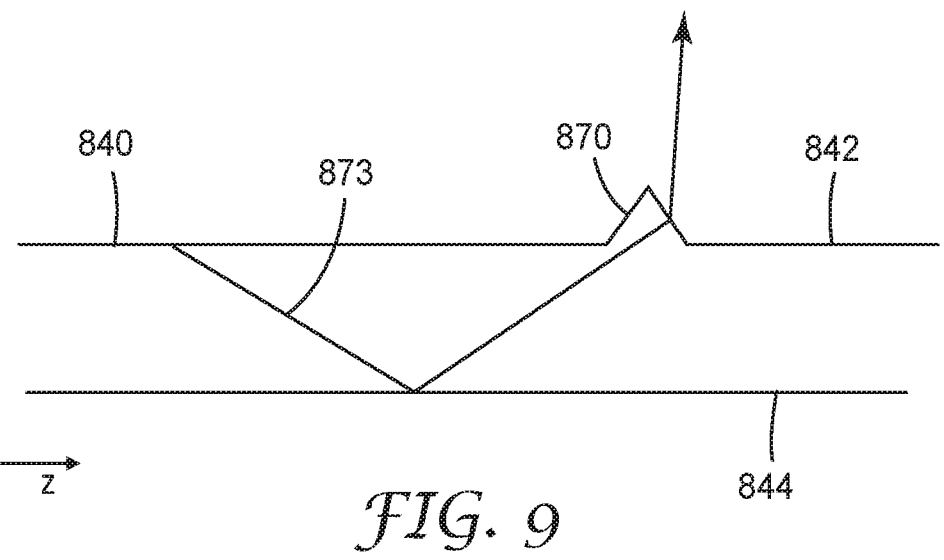

FIG. 9 is a schematic cross-sectional view of lightguide 840 having opposing first and second major surfaces 842 and 844 including a light extractor 870 which is a protrusion formed on first major surface 842 of lightguide 840 which is an exterior surface of the lightguide 840. Light 873 propagates within the lightguide 840 and is confined within the lightguide 840 primarily by total internal reflection. Light 873 is extracted from the lightguide 840 by refraction of the light from light extractor 870. Light extractor 870 may alternatively or in addition be formed in the second major surface 844.

Figure 10:
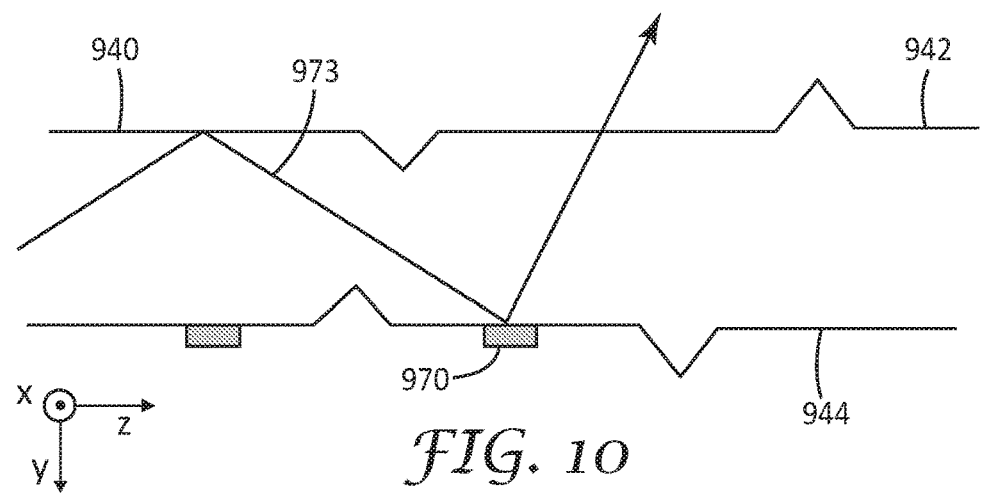

Light extractors may be disposed on each of the first and second major surfaces. FIG. 10 is a schematic cross-sectional view of lightguide 940 which include light extractors on each of the first and second major surfaces 942 and 944. In the illustrated embodiment, light 973 is extracted from the lightguide 940 by scattering of the light from light extractor 970. In some embodiments, light extractor 970 is a diffusive dot disposed on second major surface 944. Light extractor 970 may alternatively or in addition be formed in the first major surface 942.

Figure 11:
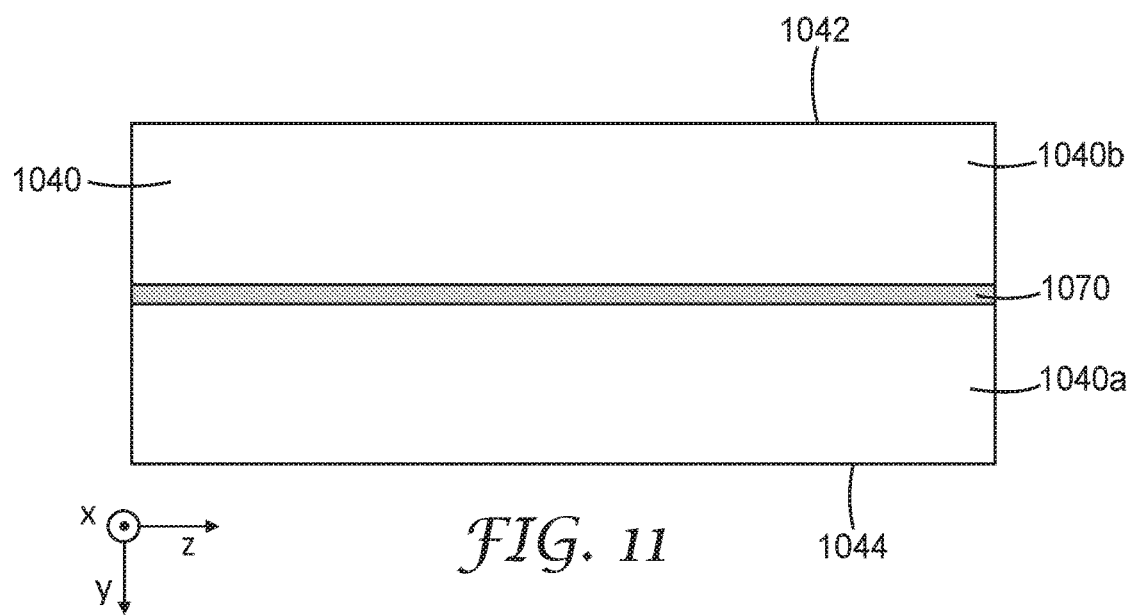

In some embodiments, at least a portion of the light extraction pattern is disposed within and between the first and second major surfaces of the lightguide. An example of a lightguide 1040 with a light extraction pattern 1070 disposed within and between the first and second major surfaces 1042 and 1044 of the lightguide 1040 is schematically illustrated in FIG. 11 which is a schematic cross-sectional view of lightguide 1040. Lightguide 1040 can be prepared, for example, by providing a lower portion 1040a of the lightguide 1040, printing or otherwise disposing the light extraction pattern 1070 onto the lower portion 1040a, applying the upper portion 1040b of the lightguide 1040 onto the light extraction pattern 1070. The light extraction pattern 1070 may include diffuse dots which extracts light primarily by scattering the light.

In some embodiments, an optically clear adhesive layer may be disposed on a bottom surface of the upper portion 1040b to facilitate bonding to the light extraction pattern 1070 and/or to an upper surface of the lower portion 1040a. The optically clear adhesive may be indexed matched to one or both of the lower and upper portions 1040a and 1040b (e.g., an absolute value of the difference between the refractive index of the lower and/or upper portions 1040a and 1040b and the optically clear adhesive may be less than 0.05, or less than 0.02, for example).

In some embodiments, at least a portion of the light extraction pattern is disposed within and between the first and second major surfaces of the lightguide by disposing beads in a resin which is extruded to form the lightguide. The light extraction pattern is then the pattern of the beads disposed in the extruded lightguide.

Figure 12:
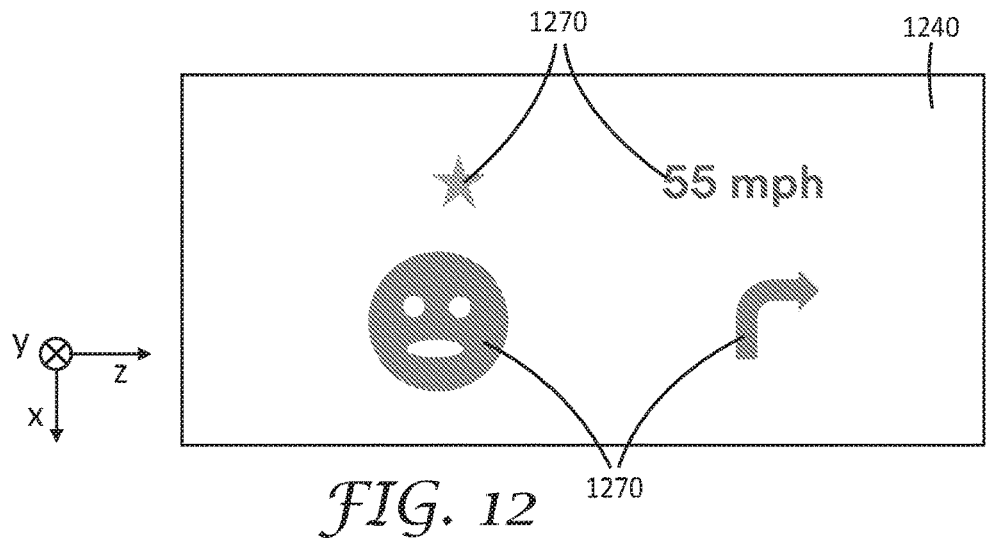
FIG. 12 is a schematic plan view of a lightguide.

In some embodiments, the light extraction pattern includes one or more of a letter, a text, a logo, an alphanumeric, a symbol, a picture, and an image. FIG. 12 is a schematic plan view of a lightguide 1240 including a light extraction pattern 1270 which includes letters (mph), text (55 mph), a logo (star), an alphanumeric (55 mph), a symbol (curved arrow), a picture (person's face) and an image (star, person's face). The shaded areas represent a high concentration of light extractors (e.g., diffusive dots, notches, protrusions) relative to the unshaded areas.

In some embodiments, a lightguide is sandwiched between and substantially coextensive with substantially specularly reflective first and second reflective layers such that when the display system is activated, a plurality of a same image is displayed stacked along a thickness direction of the lightguide, a brightness of the stacked images decreasing along the thickness direction. The first and second reflective layers may be first and second mirrors or first and second portions of a mirror; or may be first and second reflective polarizers or first and second portions of a reflective polarizer as described further elsewhere herein. In some embodiments, the lightguide has a thickness (e.g., size in the y-direction of FIG. 1) small compared to both a length (e.g., size in the z-direction of FIG. 1) and a width (e.g., size in the x-direction of FIG. 1) of the lightguide. For example, the thickness may be less than 0.1, or less than 0.05, or less than 0.01, times each of the length and the width of the lightguide. In some embodiments, the thickness of the lightguide is less than 5 mm, or less than 3 mm, and each of the width and the length of the lightguide is greater than 5 cm, or greater than 10 cm. In other embodiments, the thickness may be small compared to a length of the lightguide, but a width of the lightguide may be comparable to the thickness. In some embodiments, the lightguide has a round cross-sectional profile, or a circular cross-sectional profile, or an elliptical cross-sectional profile, or a mushroom cross-sectional profile, or a polygonal cross-sectional profile, or a rectangular cross-sectional profile, or a square cross-sectional profile.

Figure 13:
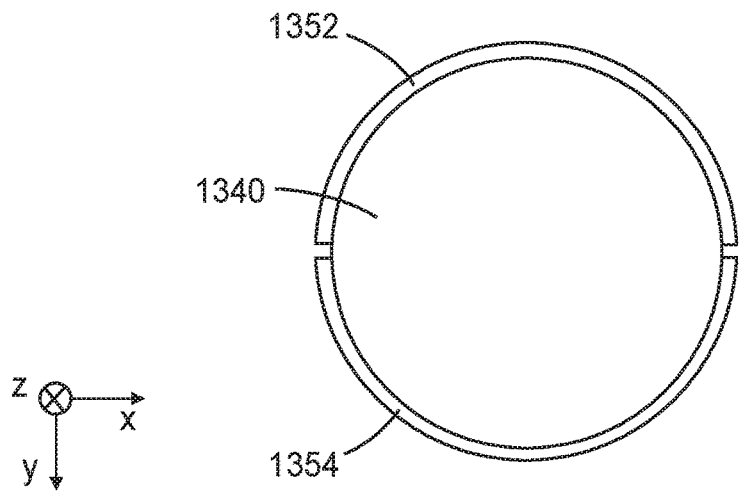
FIG. 13 is a schematic cross-sectional view of a lightguide between first and second reflectors.
Figure 14:
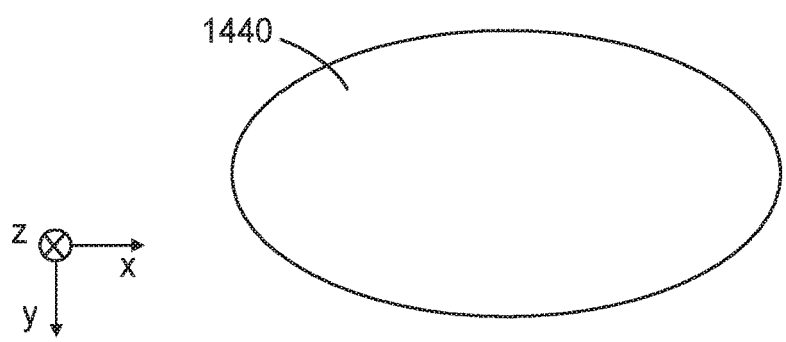
FIGS. 14-18 are schematic cross-sectional views of lightguides.
Figure 15:
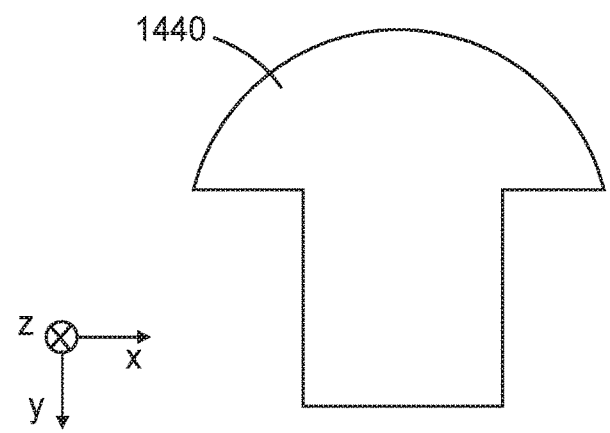
Figure 16:
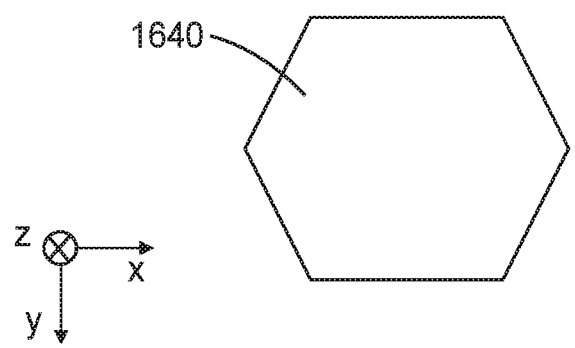
Figure 17:
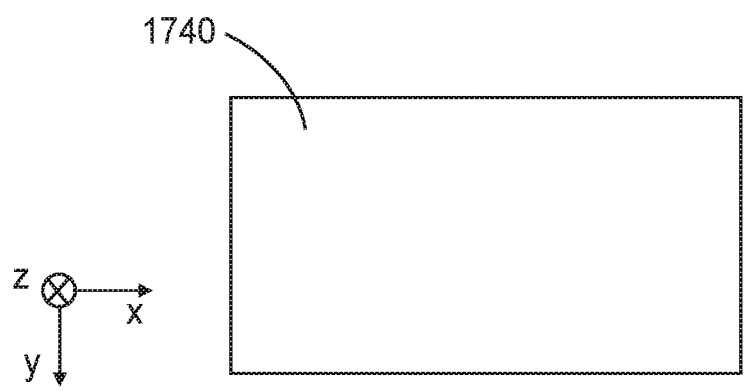
Figure 18:
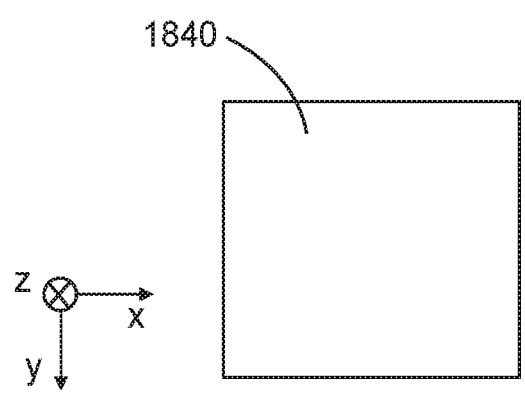

FIG. 13 is a schematic cross-sectional view of a lightguide 1340 which is sandwiched between first and second reflective layers 1352 and 1354. The lightguide 1340 and the first and second reflective layers 1352 and 1354 may be substantially coextensive with each other. In some embodiments, the first and second reflective layers 1352 and 1354 are first and second mirrors. In some embodiments, one of the first and second reflective layers 1352 and 1354 is a reflective polarizer and the other of the first and second reflective layers 1352 and 1354 is a mirror. In other embodiments, the first and second reflective layers 1352 and 1354 are first and second reflective polarizers. In still other embodiments, the first and second reflective layers 1352 and 1354 are not separated layers as illustrated in FIG. 13, but are instead different portions of a reflective layer (e.g., mirror or reflective polarizer) that wraps around the lightguide 1340. The lightguide 1340, which has a circular cross-sectional profile, may be replaced with a lightguide having a different cross-sectional profile. Suitable example lightguides are illustrated in FIGS. 14-18, respectively. Lightguides 1440, 1540, 1640, 1740 and 1840 have elliptical, mushroom, hexagonal, rectangular, and square cross-sectional profiles, respectively. The lightguides 1340 and 1440 are each examples of lightguides having round cross-sectional profiles. The lightguides 1640, 1740 and 1840 are each examples of lightguides having polygonal cross-sectional profiles.

Suitable reflective layers include, for example, metallized (e.g., silver or aluminum) mirrors, dielectric mirrors, polymeric multilayer birefringent mirrors (e.g., ENHANCED SPECULAR REFLECTOR (ESR) available from 3M Company), wire grid reflective polarizers, and polymeric multilayer birefringent reflective polarizers (e.g., DUAL BRIGHTNESS ENHANCEMENT FILM (DBEF) or ADVANCED POLARIZING FILM (APF), both available from 3M Company). The transmittance through a metalized mirror can be adjusted by adjusting the thickness of the metal layer. The number of layers and the refractive indices of the layers in a dielectric or birefringent reflector can be selected to achieve a desired transmittance and reflectance as in known in the art.

The lightguides of the present description may be made from an optically clear polymeric material or a glass, for example. Suitable polymeric materials include acrylates such as polymethyl methacrylate (PMMA), polycarbonate, and polyurethane, for example. Lightguides having light extracting features can be made by injection molding, for example. Alternatively, the lightguides can be made by first forming the lightguides without light extracting features and then creating the light extracting features through a subsequent processing step. The lightguides can be formed without light extracting structures, by extrusion or by molding, for example. The light extracting structures can then be formed by etching, laser ablation, or embossing, for example.

As used herein, terms such as "about" and "substantially" will be understood in the context in which they are used by one of ordinary skill in the art. If the use of "about" or "substantially" as applied to quantities expressing feature sizes, amounts, and physical properties is not otherwise clear to one of ordinary skill in the art in the context in which it is used, "about" and "substantially" will mean within 20 percent of the specified quantity. If the use of the phrase "substantially parallel" or "substantially perpendicular" is not otherwise clear to one of ordinary skill in the art in the context in which it is used, "substantially parallel" or "substantially perpendicular" will mean within 20 degrees of parallel or perpendicular, respectively.

The following is a list of Exemplary embodiments.

Embodiment 1 is a display system, comprising:
a lightguide, comprising:
  opposing first and second major surfaces and a first side surface at a first end of the lightguide extending between and joining the first and second major surfaces; and a light extraction pattern for extracting light that would otherwise be confined and propagate within the lightguide primarily by total internal reflection, light extracted by the light extraction pattern exiting the lightguide through at least one of the first and second major surfaces of the lightguide; and
first and second reflective layers disposed on opposite sides of the lightguide adjacent the respective first and second major surfaces of the lightguide, an average specular reflectance of each of the first and second reflective layers being at least 50% in a predetermined wavelength range.

Embodiment 2 is the display system of Embodiment 1, wherein the first reflective layer is a first reflector and the second reflective layer is a second reflector separate from the first reflector.

Embodiment 3 is the display system of Embodiment 2, wherein the first reflector is a first mirror and the second reflector is a second mirror.

Embodiment 4 is the display system of Embodiment 1, wherein the first and second reflective layers are first and second portions of a continuous reflector.

Embodiment 5 is the display system of Embodiment 4, wherein the continuous reflector is a mirror.

Embodiment 6 is the display system of Embodiment 1, wherein when a light source is disposed at the first side surface of the lightguide and light emitted by the light source enters the lightguide through the first side surface and propagates within the lightguide primarily by total internal reflection, the light extraction pattern extracts the propagating light and is visible to a viewer from a predetermined viewing distance.

Embodiment 7 is the display system of Embodiment 6, wherein the predetermined viewing distance is less than about 5 meters.

Embodiment 8 is the display system of Embodiment 6, wherein the predetermined viewing distance is greater than about 1 meter.

Embodiment 9 is the display system of Embodiment 1, wherein the lightguide is sufficiently thin and the first and second reflective layers are sufficiently close to one another so that the light extraction pattern is repeatedly imaged by the first and second reflective layers to produce a substantially hall of mirrors effect.

Embodiment 10 is the display system of Embodiment 9, wherein when a light source is disposed at the first side surface of the lightguide and light emitted by the light source enters the lightguide through the first side surface and propagates within the lightguide primarily by total internal reflection, the light extraction pattern extracts the propagating light, the light extraction pattern and the repeated images thereof being visible to a viewer from a predetermined viewing distance.

Embodiment 11 is the display system of Embodiment 1, wherein light extracted by the light extraction pattern exiting the lightguide through at least one of the first and second major surfaces of the lightguide has a substantially non-uniform brightness distribution across the lightguide.

Embodiment 12 is the display system of Embodiment 1, wherein an average specular transmittance of at least one of the first and second reflective layers is from about 1% to about 15% in the predetermined wavelength range.

Embodiment 13 is the display system of Embodiment 1, wherein an average specular transmittance of at least one of the first and second reflective layers is from about 1% to about 10% in the predetermined wavelength range.

Embodiment 14 is the display system of Embodiment 1, wherein an average specular transmittance of at least one of the first and second reflective layers is from about 1% to about 5% in the predetermined wavelength range.

Embodiment 15 is the display system of Embodiment 1, wherein the average specular reflectance of each of the first and second reflective layers is at least 80% in the predetermined wavelength range.

Embodiment 16 is the display system of Embodiment 1, wherein a spacing between at least one of the first and second reflective layers and the lightguide is non-uniform across the lightguide.

Embodiment 17 is the display system of Embodiment 1, wherein an average diffuse reflectance of at least one of the first and second reflective layers is at least 1% in the predetermined wavelength range.

Embodiment 18 is the display system of Embodiment 1, wherein an optical haze of at least one of the first and second reflective layers is between about 0.5% to about 5% in the predetermined wavelength range.

Embodiment 19 is the display system of Embodiment 1, wherein the average specular reflectance of one, but not the other, of the first and second reflective layers is at least 90% in the predetermined wavelength range.

Embodiment 20 is the display system of Embodiment 1 further comprising a first buffer layer disposed between and attached to the first reflective layer and the lightguide and having an index of refraction less than an index of refraction of the lightguide.

Embodiment 21 is the display system of Embodiment 20 further comprising a second buffer layer disposed between and attached to the second reflective layer and the lightguide and having an index of refraction less than an index of refraction of the lightguide.

Embodiment 22 is the display system of Embodiment 1, wherein at least a portion of the light extraction pattern is disposed on at least one of the first and second major surfaces of the lightguide.

Embodiment 23 is the display system of Embodiment 1, wherein at least a portion of the light extraction pattern is disposed within, and between the first and second major surfaces of, the lightguide.

Embodiment 24 is the display system of Embodiment 1, wherein the lightguide is flexible.

Embodiment 25 is the display system of Embodiment 1, wherein the lightguide is curved.

Embodiment 26 is the display system of Embodiment 1, wherein the lightguide is substantially planar.

Embodiment 27 is the display system of Embodiment 1, wherein the predetermined wavelength range is in a visible range of the electromagnetic spectrum.

Embodiment 28 is the display system of Embodiment 1, wherein the predetermined wavelength range is from about 400 nm to about 700 nm.

Embodiment 29 is the display system of Embodiment 1 further comprising a first light source disposed proximate the first side surface, light emitted by the light source entering the lightguide through the first side surface and propagating within the lightguide primarily by total internal reflection, the light extraction pattern extracting the propagating light, the extracted light propagating toward a viewer at a predetermined viewing distance and making the light extraction pattern visible to the viewer without a vision aid.

Embodiment 30 is the display system of Embodiment 29, wherein first light source comprise color changing light source.

Embodiment 31 is the display system of Embodiment 29 further comprising a second light source disposed proximate a second side surface of the lightguide opposite the first side surface.

Embodiment 32 is the display system of Embodiment 1, wherein the light extraction pattern comprises a plurality of discrete spaced apart light extractors.

Embodiment 33 is the display system of Embodiment 32, wherein each light extractor is a notch formed in an exterior surface of the lightguide.

Embodiment 34 is the display system of Embodiment 32, wherein each light extractor is a protrusion formed on an exterior surface of the lightguide.

Embodiment 35 is the display system of Embodiment 32, wherein each light extractor extracts light primarily by scattering the light.

Embodiment 36 is the display system of Embodiment 32, wherein each light extractor extracts light primarily by reflecting the light.

Embodiment 37 is the display system of Embodiment 32, wherein each light extractor extracts light primarily by refracting the light.

Embodiment 38 is the display system of Embodiment 1, wherein the light extraction pattern comprises one or more of a letter, a text, a logo, an alphanumeric, a symbol, a picture, and an image.

Embodiment 39 is a display system comprising a lightguide sandwiched between and substantially coextensive with substantially specularly reflective first and second reflective layers, such that when the display system is activated, a plurality of a same image is displayed stacked along a thickness direction of the lightguide, a brightness of the stacked images decreasing along the thickness direction.

Embodiment 40 is the display system of Embodiment 39, wherein the lightguide has a round cross-sectional profile.

Embodiment 41 is the display system of Embodiment 39, wherein the lightguide has a circular cross-sectional profile.

Embodiment 42 is the display system of Embodiment 39, wherein the lightguide has an elliptical cross-sectional profile.

Embodiment 43 is the display system of Embodiment 39, wherein the lightguide has a mushroom cross-sectional profile.

Embodiment 44 is the display system of Embodiment 39, wherein the lightguide has a polygonal cross-sectional profile.

Embodiment 45 is the display system of Embodiment 39, wherein the lightguide has a rectangular cross-sectional profile.

Embodiment 46 is the display system of Embodiment 39, wherein the lightguide has a square cross-sectional profile.

Embodiment 47 is the display system of Embodiment 39, wherein the first and second reflective layers are first and second mirrors.

Embodiment 48 is the display system of Embodiment 39, wherein the first and second reflective layers are first and second portions of a mirror.

Embodiment 49 is the display system of Embodiment 39, wherein the first reflective layer is a first reflective polarizer.

Embodiment 50 is the display system of Embodiment 49, wherein the second reflective layer is a mirror.

Embodiment 51 is the display system of Embodiment 49, wherein the second reflective layer is a second reflective polarizer.

Embodiment 52 is the display system of Embodiment 51, wherein the first reflective polarizer has a first pass axis, the second reflective polarizer has a second pass axis, and the second pass axis is parallel to the first pass axis.

Embodiment 53 is the display system of Embodiment 51, wherein the first reflective polarizer has a first pass axis, the second reflective polarizer has a second pass axis, and the second pass axis is perpendicular to the first pass axis.

Embodiment 54 is the display system of Embodiment 51, wherein the first reflective polarizer has a first pass axis, the second reflective polarizer has a second pass axis, and an angle between the first and second pass axes is between 1 and 89 degrees.

Embodiment 55 is the display system of Embodiment 39, wherein the first and second reflective layers are first and second portions of a reflective polarizer.

Embodiment 56 is the display system of Embodiment 39, wherein the first and second reflective layers are substantially parallel, substantially coextensive and have a substantially uniform spacing of less than about 5 mm therebetween.

Embodiment 57 is a display system comprising substantially parallel, coextensive first and second reflective layers having a substantially uniform spacing of less than about 5 mm therebetween, each reflective layer having an average specular reflectance of at least 85% in a predetermined wavelength range, at least one of the reflective layers having an average specular transmittance of about 1% to about 15% in the predetermined wavelength range.

Embodiment 58 is the display system of Embodiment 57, wherein each reflective layer has an average specular reflectance of at least 90% in the predetermined wavelength range, and at least one of the reflective layers has an average specular transmittance of about 1% to about 10% in the predetermined wavelength range.

Embodiment 59 is the display system of Embodiment 57, wherein each reflective layer has an average specular reflectance of at least 90% in the predetermined wavelength range, and at least one of the reflective layers has an average specular transmittance of about 1% to about 5% in the predetermined wavelength range.

Embodiment 60 is the display system of Embodiment 57, wherein the first reflective layer is a first mirror and the second reflective layer is a second mirror separate from the first mirror.

Embodiment 61 is the display system of Embodiment 57, wherein the first and second reflective layers are first and second portions of a continuous mirror.

Embodiment 62 is the display system of any one of Embodiments 57 to 61 further comprising a lightguide disposed between the first and second reflective layers such that when the display system is activated, a plurality of a same image is displayed stacked along a thickness direction of the lightguide, a brightness of the stacked images decreasing along the thickness direction.

Embodiment 63 is a display system comprising substantially parallel, coextensive first and second reflective polarizers having a substantially uniform spacing of less than about 5 mm therebetween, the first reflective polarizer having an average specular reflectance of at least 85% in a predetermined wavelength range for light polarized along a first block axis, the second reflective polarizer having an average specular reflectance of at least 85% in the predetermined wavelength range for light polarized along a second block axis, at least one of the first and second reflective polarizers having an average specular transmittance of about 1% to about 15% in the predetermined wavelength range for light polarized along the corresponding block axis.

Embodiment 64 is the display system of Embodiment 63, wherein the second reflective polarizer has an average specular reflectance of at least 90% in a predetermined wavelength range for light polarized along the second block axis, and the first reflective polarizer has an average specular transmittance of about 1% to about 10% in the predetermined wavelength range for light polarized along the first block axis.

Embodiment 65 is the display system of Embodiment 63, wherein the first reflective polarizer has an average specular reflectance of at least 90% in a predetermined wavelength range for light polarized along the first block axis, the second reflective polarizer has an average specular reflectance of at least 90% in the predetermined wavelength range for light polarized along the second block axis, and at least one of the first and second reflective polarizers has an average specular transmittance of about 1% to about 5% in the predetermined wavelength range for light polarized along the corresponding block axis.

Embodiment 66 is the display system of Embodiment 63, wherein and the second block axis is parallel to the first block axis.

Embodiment 67 is the display system of Embodiment 63, wherein the second block axis is perpendicular to the first block axis.

Embodiment 68 is the display system of Embodiment 63, wherein an angle between the first and second block axes is between 1 and 89 degrees.

Embodiment 69 is the display system of Embodiment 63 further comprising a lightguide disposed between the first and second reflective polarizers such that when the display system is activated, a plurality of a same image is displayed stacked along a thickness direction of the lightguide, a brightness of the stacked images decreasing along the thickness direction.

Embodiment 70 is the display system of any one of Embodiments 57 to 61 or 63 to 68 further comprising a lightguide, the lightguide comprising:

opposing first and second major surfaces and a first side surface at a first end of the lightguide extending between and joining the first and second major surfaces; and a light extraction pattern for extracting light that would otherwise be confined and propagate within the lightguide primarily by total internal reflection, light extracted by the light extraction pattern exiting the lightguide through at least one of the first and second major surfaces of the lightguide.

Embodiment 71 is the display system of Embodiment 70, further comprising a light source disposed proximate the first side surface, light emitted by the light source entering the lightguide through the first side surface and propagating within the lightguide primarily by total internal reflection, the light extraction pattern extracting the propagating light, the extracted light propagating toward a viewer at a predetermined viewing distance and making the light extraction pattern visible to the viewer without a vision aid.

Embodiment 72 is the display system of Embodiment 70, wherein the light extraction pattern comprises one or more of a letter, a text, a logo, an alphanumeric, a symbol, a picture, and an image.

Example

Figure 19:
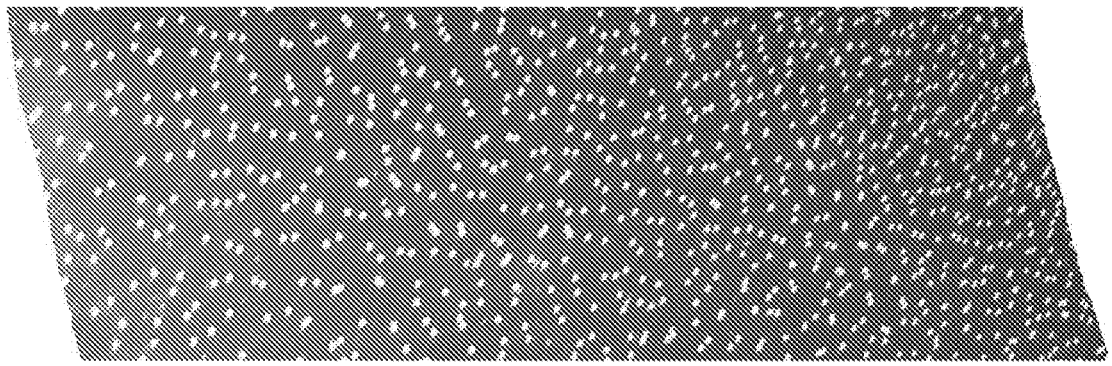
FIG. 19 is a picture of a portion of an illuminated lightguide.
Figure 20:
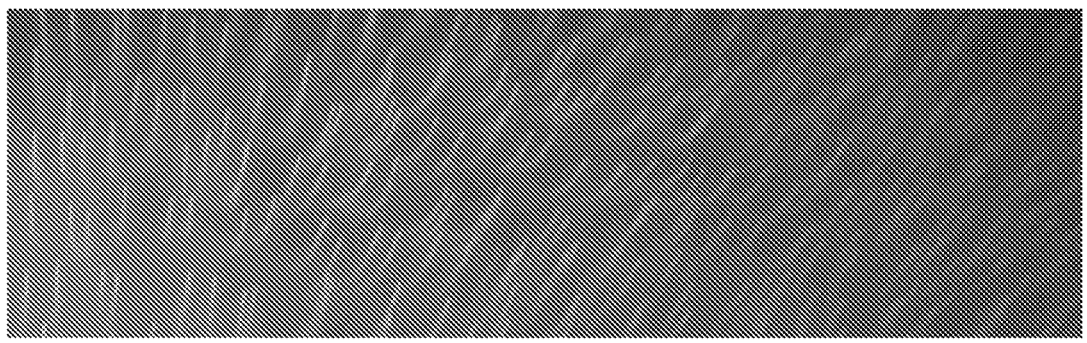
FIG. 20 is a picture of a portion of an illuminated display system.

A lightguide having a thickness of about 1.2 mm, a width of about 19 cm and a length of about 58 cm was made by extruding a polyurethane film. Extractors were then formed on a major surface of the lightguide using a $CO_2$ laser. LED strips including red, green and blue LEDs were attached to one edge of the lightguide. A picture of a portion of the illuminated lightguide is shown in FIG. 19 where the pattern of light extractors can be seen. Two mirror films (ENHANCED SPECULAR REFLECTOR (ESR) which is available from 3M Company, St. Paul, Minn. and which has an average specular reflectance of at least 98%) were placed adjacent to the lightguide above and below the lightguide. A picture of the resulting illuminated display system is shown in FIG. 20. The light extraction pattern provided a three-dimensional effect where a stack of images of the light extractor were formed so closely that the stack of images appeared to be continuous tube-like structures extending three dimensionally from the lightguide. The tube-like structures appeared brightest at the top of the structures with the brightness decreasing in the thickness direction of the lightguide.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A display system, comprising:
    a lightguide, comprising:
        opposing first and second major surfaces and a first side surface at a first end of the lightguide extending between and joining the first and second major surfaces; and
        a light extraction pattern for extracting light that would otherwise be confined and propagate within the lightguide primarily by total internal reflection, light extracted by the light extraction pattern exiting the lightguide through at least one of the first and second major surfaces of the lightguide; and
    first and second reflective layers disposed on opposite sides of the lightguide adjacent the respective first and second major surfaces of the lightguide, an average specular reflectance of each of the first and second reflective layers being at least 50% in a predetermined wavelength range.

2. The display system of claim 1, wherein the lightguide is sufficiently thin and the first and second reflective layers are sufficiently close to one another so that the light extraction pattern is repeatedly imaged by the first and second reflective layers to produce a substantially hall of mirrors effect.

3. The display system of claim 2, wherein when a light source is disposed at the first side surface of the lightguide and light emitted by the light source enters the lightguide through the first side surface and propagates within the lightguide primarily by total internal reflection, the light extraction pattern extracts the propagating light, the light extraction pattern and the repeated images thereof being visible to a viewer from a predetermined viewing distance.

4. The display system of claim 1, wherein light extracted by the light extraction pattern exiting the lightguide through at least one of the first and second major surfaces of the lightguide has a substantially non-uniform brightness distribution across the lightguide.

5. The display system of claim 1, wherein an average specular transmittance of at least one of the first and second reflective layers is from about 1% to about 15% in the predetermined wavelength range.

6. The display system of claim 1, wherein the average specular reflectance of one, but not the other, of the first and second reflective layers is at least 90% in the predetermined wavelength range.

7. The display system of claim 1, wherein the predetermined wavelength range is in a visible range of the electromagnetic spectrum.

8. The display system of claim 1 further comprising a first light source disposed proximate the first side surface, light emitted by the first light source entering the lightguide through the first side surface and propagating within the lightguide primarily by total internal reflection, the light extraction pattern extracting the propagating light, the extracted light propagating toward a viewer at a predetermined viewing distance and making the light extraction pattern visible to the viewer without a vision aid.

9. A display system comprising a lightguide sandwiched between and substantially coextensive with substantially specularly reflective first and second reflective layers, such that when the display system is activated, a plurality of a same image is displayed stacked along a thickness direction of the lightguide, a brightness of the stacked images decreasing along the thickness direction.

10. The display system of claim 9, wherein the lightguide has a round cross-sectional profile.

11. The display system of claim 9, wherein the first and second reflective layers are substantially parallel, substantially coextensive and have a substantially uniform spacing of less than about 5 mm therebetween.

12. A display system comprising substantially parallel, coextensive first and second reflective layers having a substantially uniform spacing of less than about 5 mm therebetween, each reflective layer having an average specular reflectance of at least 85% in a predetermined wavelength range, at least one of the reflective layers having an average specular transmittance of about 1% to about 15% in the predetermined wavelength range.

13. The display system of claim 12, wherein each reflective layer has an average specular reflectance of at least 90% in the predetermined wavelength range, and at least one of the reflective layers has an average specular transmittance of about 1% to about 10% in the predetermined wavelength range.

14. The display system of claim 12, wherein each reflective layer has an average specular reflectance of at least 90% in the predetermined wavelength range, and at least one of the reflective layers has an average specular transmittance of about 1% to about 5% in the predetermined wavelength range.

15. The display system of claim 12, wherein the first reflective layer is a first mirror and the second reflective layer is a second mirror separate from the first mirror.

16. The display system of claim 12, wherein the first and second reflective layers are first and second portions of a continuous mirror.

17. The display system of claim 12 further comprising a lightguide disposed between the first and second reflective layers such that when the display system is activated, a plurality of a same image is displayed stacked along a thickness direction of the lightguide, a brightness of the stacked images decreasing along the thickness direction.

* * * * *